(12) United States Patent
Zhou et al.

(10) Patent No.: US 9,369,939 B2
(45) Date of Patent: Jun. 14, 2016

(54) APPARATUS AND METHOD FOR DEVICE-TO-DEVICE COMMUNICATION ROUTE ESTABLISHMENT IN A MOBILE COMMUNICATION SYSTEM

(71) Applicant: BROADCOM CORPORATION, Irvine, CA (US)

(72) Inventors: Bin Zhou, Shanghai (CN); Jing Xu, Shanghai (CN); Haifeng Wang, Shanghai (CN); Zhenhong Li, Shanghai (CN)

(73) Assignee: BROADCOM CORPORATION, Irvine, CA (US)

( * ) Notice: Subject to any disclaimer, the term of this patent is extended or adjusted under 35 U.S.C. 154(b) by 275 days.

(21) Appl. No.: 14/093,800

(22) Filed: Dec. 2, 2013

(65) Prior Publication Data

US 2014/0094180 A1 Apr. 3, 2014

Related U.S. Application Data

(63) Continuation of application No. PCT/CN2011/075176, filed on Jun. 2, 2011.

(51) Int. Cl.
*H04W 40/00* (2009.01)
*H04W 40/02* (2009.01)
(Continued)

(52) U.S. Cl.
CPC .............. *H04W 40/02* (2013.01); *H04W 40/30* (2013.01); *H04W 76/023* (2013.01); *H04W 8/005* (2013.01)

(58) Field of Classification Search
CPC . H04W 84/047; H04W 88/04; H04W 72/042; H04W 72/0406; H04W 40/22; H04W 40/02; H04W 84/18; H04W 40/00; H04W 52/46; H04W 76/02; H04W 72/12; H04W 76/023; H04B 7/2606; H04B 7/155; H04B 7/15542; H04B 7/14
USPC ................ 455/445, 450–455, 507–517, 11.1; 370/315, 329, 341
See application file for complete search history.

(56) References Cited

U.S. PATENT DOCUMENTS

2003/0144003 A1 7/2003 Ranta et al.
2008/0002658 A1 1/2008 Soliman
(Continued)

FOREIGN PATENT DOCUMENTS

CN 101772199 A 7/2010
WO WO 2009/138820 A1 11/2009

OTHER PUBLICATIONS

PCT International Search Report and Written Opinion mailed Mar. 8, 2012 issued in a related PCT International Application No. PCT/CN2011/075176 (8 pages).

*Primary Examiner* — Allahyar Kasraian
(74) *Attorney, Agent, or Firm* — Foley & Lardner LLP; Christopher J. McKenna; Helen H. Zhang

(57) ABSTRACT

The invention concerns a method and an apparatus for device-to-device communication route establishment within a mobile communication system. In the method a mobile node determines that a remote node is within radio coverage of the mobile node. The mobile node determines a need to transmit a data message to a destination node. The mobile node transmits a request message to the base station. In reply the mobile node receives a message including a route to the destination node. The route includes at least an identifier of the remote node. The mobile node obtains a radio resource for radio communication between the mobile node and the remote node from the base station. Thereupon, the mobile node transmits the data message to the remote node using the radio resource obtained.

20 Claims, 6 Drawing Sheets

(51) Int. Cl.
  *H04W 40/30* (2009.01)
  *H04W 76/02* (2009.01)
  *H04W 8/00* (2009.01)

(56) References Cited

U.S. PATENT DOCUMENTS

2010/0008312 A1* 1/2010 Viswanath .......... H04W 72/042
                                                                 370/329
2011/0117907 A1* 5/2011 Hooli .................... H04W 72/02
                                                                 455/422.1
2011/0134827 A1* 6/2011 Hooli .................... H04W 72/04
                                                                 370/315
2011/0194485 A1* 8/2011 Horneman .......... H04W 72/042
                                                                 370/315
2012/0250545 A1* 10/2012 Papadogiannis ...... H04W 40/12
                                                                 370/252
2012/0307673 A1* 12/2012 Chang ................ H04B 7/15592
                                                                 370/252
2013/0137441 A1* 5/2013 Kruglick ................ H04B 7/155
                                                                 455/445
2014/0057670 A1* 2/2014 Lim ...................... H04W 8/005
                                                                 455/509

* cited by examiner

|    | N1 | N2 | N3 | N4 | N5 | N6 |
|----|----|----|----|----|----|----|
| N1 |    | 1  | 0  | 0  | ?  | ?  |
| N2 | 1  |    | 1  | 0  | 0  | 0  |
| N3 | 0  | 1  |    | 1  | 1  | 0  |
| N4 | 0  | 0  | 1  |    | 1  | ?  |
| N5 | ?  | 0  | 1  | 1  |    | 1  |
| N6 | ?  | 0  | 0  | ?  | 1  |    |

FIG. 3A

|    | N1 | N2 | N3 | N4 | N5 | N6 |
|----|----|----|----|----|----|----|
| N1 |    | 1  | 0  | 0  | ?  | ?  |
| N2 | 1  |    | 1  | 0  | 0  | 0  |
| N3 | 0  | 1  |    | 1  | 1  | 0  |
| N4 | 0  | 0  | 1  |    | 1  | ?  |
| N5 | P  | 0  | 1  | 1  |    | 1  |
| N6 | P  | 0  | 0  | ?  | 1  |    |

FIG. 3B

APPARATUS AND METHOD FOR DEVICE-TO-DEVICE COMMUNICATION ROUTE ESTABLISHMENT IN A MOBILE COMMUNICATION SYSTEM

CROSS REFERENCE TO RELATED APPLICATION

This application is a Continuation of PCT International Patent Application No. PCT/CN2011/075176 filed on Jun. 2, 2011, the entire content of which is incorporated herein by reference.

FIELD OF THE INVENTION

The invention relates to mobile communications networks, device-to-device communication between end-user devices, and an apparatus and a method for device-to-device communication route establishment in a mobile communication system.

BACKGROUND INFORMATION

The field of data communications has been in turmoil during the recent years. New technologies are being introduced while old technologies are being dismantled. Particularly, the data rates in wireless mobile communication systems have been increasing in the recent years rapidly. Long-Term Evolution (LTE) standardized by the 3G Partnership Project (3GPP) represents a significant leap forward in wireless mobile communication systems. One of the main objectives of the LTE is the providing of downlink data rates of at least 100 Mbps and uplink date rates of at least 50 Mbps. The LTE operates in two modes, namely the Frequency Division Duplex (FDD) and the Time Division Duplex (TDD). In FDD the uplink and downlink transmissions use different frequency bands, which are separated by a frequency offset. Thus, the FDD operates in paired frequency bands. From a mobile node, that is, user equipment perspective there are two carrier frequencies one for the uplink transmission and another for the downlink reception. The downlink reception and uplink transmission occur simultaneously. The downlink reception uses the Orthogonal Frequency Division Multiple Access (OFDMA) while the uplink transmission uses the Single Carrier Frequency Division Multiple Access (SC-FDMA). The reason for the use of SC-FDMA in uplink transmission is the high Peak-to-Average Power Ratio (PAPR) in OFDMA signal transmission. An amplifier in an OFDMA transmitter must stay in amplifier linear area by using extra power back-off. This leads to increased battery consumption or shorter uplink range. The shorter uplink range may be a problem for mobile nodes that are far from a base station. In FDD the problem is the required availability of enough radio spectrum for the paired band. Therefore, TDD has been standardized as an alternative for FDD. TDD uses the same frequency band for transmission and reception so that the base station and the mobile node take turns in transmission. TDD emulates full-duplex transmission in a transmission which is essentially half-duplex in nature. This is possible because of the rapid change in the transmission direction.

The possibility for device-to-device communication between end-user terminals has been discussed in LTE standardization. The use of device-to-device communication provides certain advantages. Firstly, it allows the saving of uplink and downlink radio resources, for example, OFDMA or SC-FDMA resource blocks to be freed and thereby increases the overall capacity available for users that cannot harness device-to-device communication for their own purposes, for example, if they are downloading files from a distant server. Secondly, device-to-device communication may take place within frequency bands having a transmission power upper limit such as TV channels adjacent to an operational TV channel in TV White Spaces (TVWS). Thirdly, device-to-device communication may be used to increase the coverage area of a base station cell to areas where it would otherwise not reach, for example, to tunnels, caves and buildings not equipped with base stations. This is achieved by the use of chains of end-user devices that end to a device which is actually within the coverage area of a base station cell. Fourthly, the use of the use of device-to-device communication requires less transmission power compared to normal uplink transmission and that in turn reduces battery drainage. Fifthly, in some cases device-to-device communication may provide better radio channel quality, which in turn leads to improved Quality of Service (QoS) for users.

In order to be able to establish device-to-device communication an initiating device must request a radio resource for probing the target device. The probing involves transmitting a test signal to the target device. If the quality of the test signal is sufficient, the devices may start communicating using a radio resource for device-to-device communication. If the test transmission fails to reach the target device or the quality is too low, the devices must communicate conventionally via a base station and a core network. Obviously, such an event-triggered device-to-device communication set-up process involves a lot of signaling overhead to the cellular system and a long communication establishment delay as well, especially when test transmission fails. The establishing of a multi-hop device-to-device communication path may involve a significant delay.

It would be beneficial to be able to establish beforehand information on possible device-to-device communication routes to a mobile communication system, for example, in areas where device-to-device communication occurs frequently. The pre-established information would speed up the process of establishing device-to-device communication routes. The communication routes may involve a number of hops via different end-user devices or the routes may just be direct connections between two end-user devices. More benefit is achieved if the routes include multiple hops.

In the area of ad-hoc networks, which refer to networks including mobile devices as potential routers, certain routing methods have been developed. In pro-active routing methods such as the Highly Dynamic Destination-Sequenced Distance Vector Routing Protocol (DSDV) routing tables are maintained on each node acting as a router. The routing tables are constructed using route advertisements distributed by all nodes in the network. The routing tables include information on destinations, next hops, distance and sequence numbers to determine the age of route information. The disadvantages of pro-active routing methods include the amount of data and the number of route advertisements that must be exchanged by nodes for the maintenance of up-to-date routing table. The pro-active routing methods are also slow to react to ad-hoc network topology changes and inter-device link failures. Other examples of pro-active routing methods include Ad-hoc Wireless Distribution Service (AWDS), which is a layer 2 wireless mesh routing protocol, and Direction Forward Routing (DFR).

By contrast, there are source-initiated on-demand protocols, which may also be called reactive routing protocols. An example of such a protocol is the Dynamic Source Routing Protocol (DSR) for mobile ad-hoc networks for IPv4. A source-initiated on-demand protocol finds a route, when sending a packet to a new destination, by flooding the network with route request packets. The route request packets record the nodes traversed. The destination replies with a route reply packet containing the strict node-by-node route to the destination. The disadvantages of such algorithms are high latency time in the finding of routes and the fact that excessive flooding of route request packets can lead to network clogging. Another example of a source-initiated on-demand protocol is the RSRP: Robust Secure Routing Protocol (RSRP) for mobile ad-hoc networks.

SUMMARY OF THE INVENTION

According to an aspect of the invention, the invention is a method, including: determining that a remote node is within radio coverage of a mobile node; determining, in the mobile node, a need to transmit a data message to a destination node; transmitting a request message to the base station; receiving from the base station a reply message including a route to the destination node, the route including at least an identifier of the remote node; transmitting, to the base station, a request for a radio resource for radio communication between the mobile node and the remote node; receiving, from the base station, an assignment of the radio resource to the mobile node; and transmitting the data message to the remote node using the radio resource.

According to a further aspect of the invention, the invention is a method, including: receiving an indication of an existence of a radio link between a mobile node and a remote node to a base station; adding information on the radio link to a link status data structure; receiving a request message to the base station; determining an identifier of a destination node using information in the request message; determining a route from the mobile node to the destination node using the link status data structure, the route including the remote node; transmitting from the base station a reply message including the route to, the route being to a destination node and the route including at least an identifier of the remote node; receiving, from the mobile node, a request for a radio resource for radio communication between the mobile node and the remote node; and transmitting, to the mobile node, an assignment of the radio resource for the mobile node.

According to a further aspect of the invention, the invention is an apparatus including: at least one processor configured to determine that a remote node is within radio coverage of the apparatus, to determine a need to transmit a data message to a destination node, to transmit a request message to a base station, to receive from the base station a reply message including a route to the destination node, the route including at least an identifier of the remote node, to transmit to the base station, a request for a radio resource for radio communication between the apparatus and the remote node, to receive from the base station an assignment of the radio resource to the apparatus, and to transmit the data message to the remote node using the radio resource.

According to a further aspect of the invention, the invention is a mobile node including the apparatus.

According to a further aspect of the invention, the invention is an apparatus including: at least one processor configured to receive an indication of an existence of a radio link between a mobile node and a remote node, to update information on the radio link to a link status data structure, to receive a request message, to determine an identifier of a destination node using information in the request message, to determine a route from the mobile node to the destination node using the link status data structure, the route including the remote node, to transmit a reply message including the route to a destination node, the route including at least an identifier of the remote node, to receive from the mobile node a request for a radio resource for radio communication between the mobile node and the remote node, and to transmit to the mobile node an assignment of the radio resource for the mobile node.

According to a further aspect of the invention, the invention is a base station including the apparatus.

According to a further aspect of the invention, the invention is an apparatus including: means for determining that a remote node is within radio coverage of the apparatus; means for determining a need to transmit a data message to a destination node; means for transmitting a request message to the base station; means for receiving from the base station a reply message including a route to the destination node, the route including at least an identifier of the remote node; means for transmitting, to the base station, a request for a radio resource for radio communication between the apparatus and the remote node; means for receiving, from the base station, an assignment of the radio resource to the mobile node; and means for transmitting the data message to the remote node using the radio resource.

According to a further aspect of the invention, the invention is an apparatus including: means for receiving an indication of an existence of a radio link between a mobile node and a remote node to the apparatus; means for adding information on the radio link to a link status data structure; means for receiving a request message to the apparatus; means for determining an identifier of a destination node using information in the request message; means for determining a route from the mobile node to the destination node using the link status data structure, the route including the remote node; means for transmitting from the apparatus a reply message including the route to a destination node, the route including at least an identifier of the remote node; means for receiving, from the mobile node, a request for a radio resource for radio communication between the mobile node and the remote node; and means for transmitting, to the mobile node, an assignment of the radio resource for the mobile node.

According to a further aspect of the invention, the invention is a base station including the apparatus.

According to a further aspect of the invention, the invention is a computer program including code adapted to cause the following when executed on a data-processing system: determining that a remote node is within radio coverage of a mobile node; determining, in the mobile node, a need to transmit a data message to a destination node; transmitting a request message to the base station; receiving from the base station a reply message including a route to the destination node, the route including at least an identifier of the remote node; transmitting, to the base station, a request for a radio resource for radio communication between the mobile node and the remote node; receiving, from the base station, an assignment of the radio resource to the mobile node; and transmitting the data message to the remote node using the radio resource.

According to a further aspect of the invention, the invention is a computer program product including the computer program.

According to a further aspect of the invention, the invention is a computer program including code adapted to cause the following when executed on a data-processing system: receiving an indication of an existence of a radio link between a mobile node and a remote node to a base station; adding information on the radio link to a link status data structure; receiving a request message to the base station; determining an identifier of a destination node using information in the request message; determining a route from the mobile node to the destination node using the link status data structure, the route including the remote node; transmitting from the base station a reply message including the route to a destination node, the route including at least an identifier of the remote node; receiving, from the mobile node, a request for a radio resource for radio communication between the mobile node and the remote node; and transmitting, to the mobile node, an assignment of the radio resource for the mobile node.

According to a further aspect of the invention, the invention is a computer program product including the computer program.

According to a further aspect of the invention, the invention is a method, including the following or the invention is a computer program including code adapted to cause the following, when executed on a data-processing system: receiving an indication of an existence of a radio link between a mobile node and a remote node; adding information on the radio link to a link status data structure; receiving a request message; determining an identifier of a destination node using information in the request message; determining a route from the mobile node to the destination node using the link status data structure, the route including the remote node; transmitting a reply message including the route to a destination node, the route including at least an identifier of the remote node.

According to a further aspect of the invention, the invention is a network node including: at least one processor configured to receive an indication of an existence of a radio link between a mobile node and a remote node, to add information on the radio link to a link status data structure, to receive a request message, to determine an identifier of a destination node using information in the request message, to determine a route from the mobile node to the destination node using the link status data structure, the route including the remote node, and to transmitting a reply message including the route, the route being to a destination node, the route including at least an identifier of the remote node.

In one embodiment of the invention, the apparatus, for example, the mobile node further includes at least one radio frequency circuit.

In one embodiment of the invention, the apparatus, for example, the base station further includes at least one radio frequency circuit.

In one embodiment of the invention, the step of determining that a remote node is within radio coverage of a mobile node includes receiving a test signal from the remote node and transmitting a response to the test signal to the remote node.

In one embodiment of the invention, the step of determining that a remote node is within radio coverage of a mobile node includes transmitting a test signal from the mobile node and receiving a response to the test signal from the remote node.

In one embodiment of the invention, the at least one processor within the apparatus is further configured to receive from the base station a request to execute the transmission of the test signal.

In one embodiment of the invention, by the existence of a radio link between the mobile node and the remote node is meant that the mobile node and the remote node are within each others coverage area. The existence of the radio link does not necessitate the existence of radio resources allocated for communication between the mobile node and the remote node or the existence of a radio link layer connection between the mobile node and the remote node.

In one embodiment of the invention, the remote node and destination node are separate nodes.

In one embodiment of the invention, the radio resource includes at least one orthogonal frequency division multiple access resource element. The at least one resource element may be on adjacent subcarriers or in adjacent symbols. The resource elements may be seen as elements in a resource grid.

In one embodiment of the invention, the radio resource includes at least one resource block, for example, an orthogonal frequency division multiple access resource block or a single-carrier frequency division multiple access resource block. A signal transmitted in a slot may be described by a resource grid of a given number of subcarriers, for example, 12 subcarriers, and a given number of symbols, for example, 5, 6 or 7 symbols. Such a radio resource may be used for transmitting the data message or the test signal.

In one embodiment of the invention, the radio resource includes at least one resource element, for example, an orthogonal frequency division multiple access resource element or a single-carrier frequency division multiple access resource element. The at least one resource element may be included in a resource grid or in a resource block. In a resource grid or in a resource block rows may represent subcarriers and columns may represent symbols. Such a radio resource may be used for transmitting at least one of the data message, the test signal, and the response to the test signal.

In one embodiment of the invention, the radio resource may include at least one of a channel, a frequency band, a subcarrier, a carrier, a symbol and a slot.

In one embodiment of the invention, the destination node is identified with a destination party identifier, for example, in the request message. The destination party identifier may be, for example, a network address, for example, an IPv4 address or IPv6 address. The destination party identifier may be also an identifier of the destination node, for example, an identifier of a destination mobile node. The destination node identifier may be associated with the destination node by a subscription specifying a mobile subscriber, for example, using a subscriber identity entity, for example, a module, a memory, a card or any circuit. The entity may be removable.

In one embodiment of the invention, the destination node is identified with an identifier used to identify the destination node in a radio access network, for example, an International Mobile Subscriber Identity (IMSI) or a temporary identifier assigned for the destination node by the radio access network.

In one embodiment of the invention, the remote node is identified with an identifier used to identify the remote node in a radio access network, for example, an International Mobile Subscriber Identity (IMSI) or a temporary identifier assigned for the remote node by the radio access network.

In one embodiment of the invention, the destination node identifier or the destination party identifier is included in the data message and used by any given mobile nodes along the route to determine whether the data message is target to the given mobile node.

In one embodiment of the invention, a radio link between the mobile node and the remote node is determined using identifiers of the mobile node and the remote node.

The mobile node identifier may be a network address or the mobile node is identified with an identifier used to identify the remote node in a radio access network, for example, an International Mobile Subscriber Identity (IMSI) or a temporary identifier assigned for the remote node by the radio access network.

In one embodiment of the invention, the at least one processor of the apparatus, for example, of a mobile node is further configured to receive from the base station a request to execute the transmission of the test signal.

In one embodiment of the invention, the at least one processor of the apparatus, for example, of a mobile node is further configured to transmit at least one of the data message and the test signal using an orthogonal frequency division multiple access transmitter, in other words, using orthogonal frequency division multiple access transmission. The at least one processor may be further configured to receive the response to the test signal or any message from the remote node using an orthogonal frequency division multiple access receiver. The transmitter and receiver may be parts of a transceiver.

In one embodiment of the invention, the at least one processor of the apparatus, for example, of a mobile node is further configured to transmit the data message using a single carrier frequency division multiple access transmitter, in other words, using single carrier frequency division multiple access transmission.

In one embodiment of the invention, the at least one processor of the apparatus, for example, of a mobile node is further configured to determine a quality degradation in the radio resource and to transmit an indication of non-existence of a radio link between the mobile node and the remote node to the base station.

In one embodiment of the invention, the destination party identifier includes at least one of an internet protocol address, logical name of a user of the destination node, a domain name, a uniform resource identifier, and a mobile subscriber Integrated Services Digital Network (ISDN) number. The Uniform Resource Identifier (URI) may be also a Tel-URI or a Session Initiation Protocol (SIP) URI.

In one embodiment of the invention, the identifier of the remote node is at least one of a mobile subscriber identity, an international mobile subscriber identity, a temporary mobile subscriber identity, a globally unique temporary user equipment identity, and a radio network temporary identifier.

In one embodiment of the invention, the mobile node further includes at least one radio frequency circuit.

In one embodiment of the invention, the at least one processor of the apparatus, for example, of a mobile node is further configured to transmit at least one test signal between the mobile node and the remote node to determine whether the mobile node and the remote node are within a range providing sufficient radio quality for communication between the mobile node and the remote node.

In one embodiment of the invention, the at least one processor of the apparatus, for example, of a mobile node is further configured to receive from the base station a request to execute the transmission of the at least one test signal and to report a quality of reception of the at least one test signal to the base station.

In one embodiment of the invention, at least one of the at least one radio frequency circuit and the at least one processor of the apparatus, for example, of a mobile node, is further configured to switch to reception on the radio resource in the mobile node and to receive a data signal from the remote node to the mobile node on the radio resource.

In one embodiment of the invention, at least one of the at least one radio frequency circuit and the at least one processor of the apparatus, for example, of a mobile node, is further configured to transmit the data message to the remote node using the radio resource using an orthogonal frequency division multiple access transmitter.

In one embodiment of the invention, at least one of the at least one radio frequency circuit and the at least one processor of the apparatus, for example, of a mobile node, is further configured to transmit the data message to the remote node using a single carrier frequency division multiple access transmitter.

In one embodiment of the invention, at least one of the at least one radio frequency circuit and the at least one processor of the apparatus, for example, of a mobile node, is further configured to receiving from the base station a request to stop using the radio resource at the mobile node.

In one embodiment of the invention, the mobile node includes a Long-Term Evolution (LTE) User Equipment.

In one embodiment of the invention, the remote node is a remote mobile node, for example an LTE User Equipment (UE). The remote node may also be a desktop, a desk computer or a server.

In one embodiment of the invention, the at least one processor of the base station is further configured to detect a number of device-to-device communication establishments within an area included in a cell controlled by the base station, the number exceeding a predefined threshold, and to initiate requesting of at least one test transmission between a first requested mobile node and a second requested mobile node in response to the detection, at least one of the first requested mobile node and the second requested mobile node being within the area.

In one embodiment of the invention, the area includes at least one of a cell, a cell sector, a part of cell area, an area with a specific distance range from the base station, and a geographic area.

In one embodiment of the invention, the geographic area is determined using positioning of the at least one of the first requested mobile node and the second requested mobile node by the base station.

In one embodiment of the invention, the at least one processor of the base station is further configured to determine that the route from the mobile node to the destination node in the link status data structure includes a number of hops exceeding a predefined threshold, to determine at least one alternative route with at least one hop less, the alternative route having a first candidate mobile node and a second candidate mobile node that have between them a link with untested status, and to request a test transmission between the first candidate mobile node and the second candidate mobile node in order to determine whether the route may be shortened.

In one embodiment of the invention, the step of determining an identifier of the destination node using information in the request message further includes mapping a destination party identifier in the request message to the identifier of the destination node.

In one embodiment of the invention, the link status data structure is stored in a remote core network node communicatively connected to the base station.

In one embodiment of the invention, the link status data structure is a matrix with matrix elements indicating link status and rows and columns indicating mobile nodes.

In one embodiment of the invention, the destination party identifier includes at least one of an internet protocol address, logical name of a user of the destination node, a domain name, a uniform resource identifier, and a mobile subscriber Integrated Services Digital Network (ISDN) number.

In one embodiment of the invention, the symbols are OFDMA or Single Carrier Frequency Division Multiple Access (SC-FDMA) symbols.

In one embodiment of the invention, the mobile node includes a Long-Term Evolution (LTE) User Equipment. At least one processor in the mobile node may be configured to perform the method steps disclosed hereinabove. The transmission and reception related method steps may be performed by the at least one radio frequency circuit.

In one embodiment of the invention, the base station is an apparatus including a number of base station receivers and/or transmitters and a base station node. The base station node may be a base station server or a central unit.

In one embodiment of the invention, the at least one radio frequency circuit of the base station is included in a base station receiver and the at least one processor of the base station is included in a base station node. The base station receiver may also include a transmitter.

In one embodiment of the invention, the base station includes an Evolved UMTS Radio Access Network (E-UTRAN) node such as, for example, an Evolved NodeB. At least one processor in the base station node may be configured to perform the method steps disclosed hereinabove. The transmission and reception may be performed by the at least one radio frequency circuit.

In one embodiment of the invention, the communication that is set-up may be a connection, for example, a transport layer connection, such as, for example, a TCP connection or a Stream Control Transmission Protocol (SCTP) connection. The communication may also be a flow of individual packets, for example, a flow of UDP packets. The flow of UDP packets may represent, for example, a media component associated with a multimedia session. In one embodiment of the invention, the communication may be set-up or established on any protocol layer, for example, it may be established, for example, also on Point-To-Point Protocol (PPP) layer or on a logical link layer.

In one embodiment of the invention, the base station includes an OFDMA radio network node or an SC-FDMA radio network node.

In one embodiment of the invention, the at least one Radio Frequency (RF) circuit in the mobile node may also be referred to as at least one circuit.

In one embodiment of the invention, the at least one Radio Frequency (RF) circuit in the base station node may also be referred to as at least one circuit.

In one embodiment of the invention, the mobile node such as a User Equipment (UE) includes a mobile station or generally a mobile terminal. In one embodiment of the invention a user of a mobile terminal is identified using a subscriber module, for example, User Services Identity Module (USIM) or a Subscriber Identity Module (SIM). The combination of Mobile Equipment (ME) and a subscriber module may be referred to as a mobile subscriber. A mobile subscriber may be identified using an IMSI. An IP address may be allocated or associated with a mobile subscriber.

In one embodiment of the invention, identifier of the remote party being associated with a remote node includes that the identifier of the remote party is allocated for the remote node. The identifier of the remote node may be an address allocated for the remote node. The address allocation may be performed, for example, by an address allocation server. The address may be stored in a Packet Data Network Gateway (P-GW). The address may be used to route packets to the remote node via the P-GW. The address may be an IP address, for example, an IPv4 or IPv6 address.

In one embodiment of the invention, the remote party identifier is or includes a mobile subscriber identity, for example, the International Mobile Subscriber Identity (IMSI).

In one embodiment of the invention, the remote party identifier is or includes an identifier or an address of the remote party, for example, a Uniform Resource Identifier, a Mobile Subscriber ISDN (MSISDN) number, a logical name, a name, an E-mail address or any other identity.

In one embodiment of the invention, the apparatus is a mobile terminal, for example a, mobile handset.

In one embodiment of the invention, the apparatus is a semiconductor circuit, a chip or a chipset.

In one embodiment of the invention, the mobile node is a chip or a chipset.

In one embodiment of the invention, the base station node is configured to be used in a 4 G system such as, for example, LTE Evolved Packet System (EPS).

In one embodiment of the invention, a radio resource, for the transmission or for the device-to-device transmission may be a particular channel, a given number of symbols on a given number of subcarriers, a given number of subcarriers within a symbol time, a number of resource elements, or a number of resource blocks. The radio resource location in terms of frequency and time may be indicated by the base station.

In one embodiment of the invention, the computer program is stored on a computer readable medium. The computer readable medium may be, but is not limited to, a removable memory card, a removable memory module, a magnetic disk, an optical disk, a holographic memory or a magnetic tape. A removable memory module may be, for example, a USB memory stick, a PCMCIA card or a smart memory card.

In one embodiment of the invention, the computer program product is stored on a computer readable medium. The computer readable medium may be, but is not limited to, a removable memory card, a removable memory module, a magnetic disk, an optical disk, a holographic memory or a magnetic tape. A removable memory module may be, for example, a USB memory stick, a PCMCIA card or a smart memory card.

The embodiments of the invention described hereinbefore may be used in any combination with each other. Several of the embodiments may be combined together to form a further embodiment of the invention. A method, a base station, an apparatus, a computer program or a computer program product to which the invention is related may include at least one of the embodiments of the invention described hereinbefore.

It is to be understood that any of the above embodiments or modifications can be applied singly or in combination to the respective aspects to which they refer, unless they are explicitly stated as excluding alternatives.

The benefits of the invention are related to enhanced data transmission capacity in a mobile communication system by the virtue of increased use of device-to-device communication in place of uplink and downlink communication with a base station to and reduced delay in establishing device-to-device communications involving multiple hops. The invention relates also to a reduced number of routing related messages in device-to-device communication.

BRIEF DESCRIPTION OF TEE DRAWINGS

The accompanying drawings, which are included to provide a further understanding of the invention and constitute a part of this specification, illustrate embodiments of the invention and together with the description help to explain the principles of the invention. In the drawings:

FIG. 3A illustrates a device-to-device link status data structure and the use of the data structure for routing between two mobile nodes in one embodiment of the invention;

FIG. 3B illustrates a device-to-device link status data structure, the use of the data structure for routing between two mobile nodes and the probing of the status of two device-to-device links in one embodiment of the invention;

DETAILED DESCRIPTION

Reference will now be made in detail to the embodiments of the present invention, examples of which are illustrated in the accompanying drawings.

Figure 1:
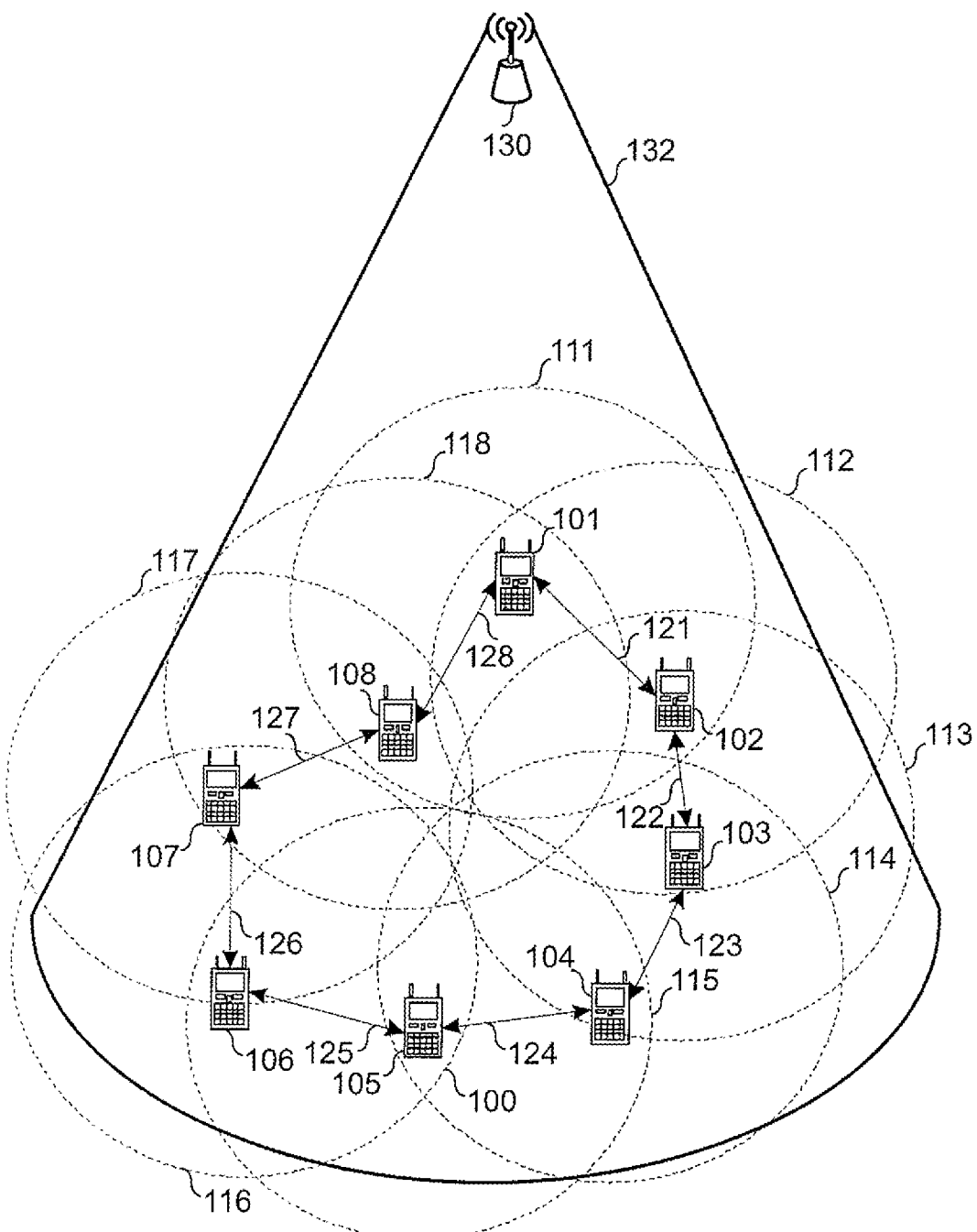
FIG. 1 illustrates a cell and a plurality of communicating mobile nodes within a mobile communication system in one embodiment of the invention.

FIG. 1 illustrates a cell and a plurality of communicating mobile nodes within a mobile communication system in one embodiment of the invention. FIG. 1 illustrates a base station 130 providing a cell 132. The cell may be included in an LTE mobile communication system, including, for example, an Evolved UMTS Radio Access Network (E-UTRAN). In FIG. 1 there is only illustrated base station 130 from the E-UTRAN. There may be a plurality of other base station together with their cells. Base station 130 in E-UTRAN parlance is called an Evolved Node B (eNB). Base station 130 may include at least one Remote Radio Head (RRH) (not shown) communicating with a base station server (not shown) within base station 130. In the area of cell 130 there are shown mobile nodes 101-108. The mobile nodes may also be referred to as User Equipments (UE), mobile stations, handsets or mobile terminals. The mobile nodes may include, for example, wireless modems, mobile phones, palmtop devices, laptop devices, desktop computers, servers and blade servers. Mobile nodes 101-108 are configured for device-to-device transmission. By device-to-device transmission is meant, for example, radio communication occurring directly between devices such as UEs, which may also receive simultaneously or separately downlink transmissions from a base station such as base station 130. In FIG. 1 mobile nodes 101-108 are the central points of their respective coverage areas 111-118. The coverage areas are assumed merely for the sake of illustration to be symmetric and circular. In practice, the shape of a coverage area for a radio transmitter, that is, its footprint may be much more intricate. In FIG. 1 no alternative routes between any two mobile nodes exist. As illustrated in the example of FIG. 1 the communication between mobile nodes follows a circular route either clockwise or anticlockwise. Any given mobile node is within the reach of only two other mobile nodes for device-to-device communication. It is illustrated that, for example, mobile node 106 and mobile node 102 do not have overlapping coverage areas. Instead, they must rely in their mutual communication to intermediate mobile nodes. They must communicate via other mobile nodes such as, for example, mobile node 103, mobile node 104 and mobile node 105 or alternatively via mobile node 101, mobile node 108 and mobile node 107. The device-to-device communication links between adjacent mobile nodes are illustrated with arrows 121-128 in FIG. 1.

Base station 130 is communicatively connected to a Core Network (CN) (not shown), which includes a Serving Gateway (S-GW), a Packet Data Network Gateway (P-GW) and a Mobility Management Entity (MME). The S-GW is communicatively connected to a Packet Data Network Gateway (P-GW), which is communicatively connected to an IP network (not shown).

In LTE an eNB, such as base station 130, performs radio resource management, including radio bearer control, radio admission control, connection mobility control and dynamic allocation, that is, assignment of radio resources to UEs such as mobile nodes 101-108. An eNB also performs IP header compression and encryption of user plane data traffic. An eNodeB selects an MME at UE attachment when no routing to an MME may be determined from the information provided by a UE at the time of the attachment. An eNB also performs mobility management signaling with the MME. It routes a user plane data towards an S-GW. An MME performs mobility management related functions such as, for example, the processing of network attach procedures and tracking area updates.

In FIG. 1 mobile nodes 101-108 initially attach to a core network associated with base station 130 and their position is made known to base station 130 and the MME communicatively connected to base station 130. Initially, a number of communications are established between two mobile nodes among mobile nodes 101-108. The communications may be optimized by base station 130 to become device-to-device communications or the communications are indicated as device-to-device communications by the mobile node users before the establishment. From the number of the device-to-device communications, that is, the fact that the number of the device-to-device communications exceeds a predefined threshold value, base station 130 may determine that it may populate, that is, start to fill at least one device-to-device link status data structure or database regarding mobile nodes being within device-to-device transmission range. Base station 130 may also determine that the device-to-device communications relate to a communication group of mobile nodes, by the communication group may be meant an equivalence class wherein equivalence relations in the equivalence class are represented by previous communications occurring between class members within a predefined timeframe. Recall that in an equivalence class the equivalence relations are in particular symmetric and transitive. Base station 130 may use the time frame to filter an equivalence class so that, for example, very old and random communications outside a core communication group do not cause the addition of nonactive mobile nodes to the communication group. Base station 130 may also determine that the device-to-device communications relate to a specific geographic area determined, for example, using the fact that the mobile nodes that performed the device-to-device communications are within a cell provided by base station 130, using a network or mobile node initiated positioning of mobile nodes, using timing advance or round trip time values for a cone shaped cell or any other positioning method such as, for example, satellite based positioning. The result of at least one of the mobile node selection based on specific geographic area of the mobile node, and mobile node selection based on a membership in the communication group of mobile nodes, is that base station 130 produces a list of candidate mobile nodes for storing in a device-to-device link status database or data structure.

Base station 130 may also determine that sufficient radio resources are available for testing the mutual reachability between mobile nodes for device-to-device communication. The testing may be executed for the mobile nodes in the list of candidate mobile nodes or for all mobile nodes which are known to be location in a cell 132 provided by base station 130. Base station 130 issues test transmission requests to a number of mobile nodes. The mobile nodes transmit test transmissions to other mobile nodes, which respond to the test transmissions, if they are within a sufficient coverage range from the transmitting mobile node. The mobile nodes that have received the responses report the fact of receiving a response in the first place or the radio quality of the response received to base station 130. Base station 130 may indicate to all potential mobile nodes that may receive a test transmission the actual radio resource used to transmit the test transmission. The potential receiving mobile nodes then may tune to the radio resource. The radio resource may be a particular channel, a given number of symbols on a given number of subcarriers, a given number of subcarriers within a symbol time, a number of resource elements, or a number of resource blocks. The radio resource location in terms of frequency and time may be indicated by base station 130. If the test transmissions requested by base station 130 from a mobile node may have multiple recipients without a particular recipient specified by base station 130 for the mobile node to be included in the test transmission, an arbitration procedure may used to determine the order or schedule of responses to the test transmission, so that the responses from different mobile nodes do not interfere with one another. The procedure may be based, for example, on an order computed from recipient mobile node identifiers. The order computed may be based, for example, on hash codes computed of the mobile node identifiers and the order of the hash codes. Responding mobile nodes may apply carrier sensing to determine that the radio resource is available for transmission. After a predetermined time following the carrier sensing, a responding mobile node may determine that the radio resource is available for its response to the test transmission. A schedule may specify a number of moments in time for transmitting the responses from different responding mobile nodes. The moments in time may be determined in the responding mobile nodes using on an order computed from recipient mobile node identifiers. The order computed may be based, for example, on hash codes computed of the mobile node identifiers and the order of the hash codes. The test transmission and the response to the test transmission may carry an identifier of the mobile node at the other end, that is, for example, the identifier of the transmitting or the receiving mobile node. The responses from mobile nodes to base station 130 identify the sender of the test and the receiver or the receivers. Thereby base station 130 may populate the device-to-device link status data structure with link statuses associated with a link between two mobile nodes. The links for which a response was received are marked to be on. The links for which no response was received are marked to be off. The links for which no test has been made are marked to be unknown or indeterminate. The data structure may be a matrix or a sparse matrix. The first row and the first column list mobile node identifiers. The other matrix elements represent link states between mobile nodes identified in the respective row and column. The mobile node identifiers may be at least one of mobile node IP addresses, mobile subscriber identities, international mobile subscriber identities, temporary mobile subscriber identities, and globally unique temporary user equipment identities. Mobile node IP addresses may be used only when an IP address has been allocated for a mobile node via P-GW.

In one embodiment of the invention, the device-to-device link status data structure, which may also be called a database, is stored in a database or in a memory within a remote core network node, for example, the MME. The data structure may be enquired by base station 130 and other base stations. Any changes to the data structure may be distributed to all base stations handling a predefined area for which the data structure is updated in one embodiment of the invention. Data structure related procedures between mobile nodes and the remote core network node, for example, determinations of candidate mobile nodes, the ordering of the executing of test transmissions between mobile nodes, updates to the data structure pertaining to link status changes and route requests from mobile nodes may also be relayed via base stations such as base station 130 in one embodiment of the invention.

The area of a data structure used by multiple base stations may include at least two cells or at least parts of cell footprints from at least two cells. In one embodiment of the invention, mobile nodes leaving the predefined area are removed from the data structure. By leaving may be meant a tracking area update to another cell or a network detach.

In one embodiment of the invention, the device-to-device link status data structure is stored in a database or in a memory within base station 130.

In one embodiment of the invention, base station 130 indicates the target mobile node identifier in a request for test transmission.

In one embodiment of the invention, base station 130 indicates to a number of mobile nodes that they are the targets of a test transmission from a mobile node. Base station 130 may indicate the radio resources, the order or the scheduling for the mobile nodes for transmitting the response to the transmitting mobile node.

In one embodiment of the invention, base station 130 indicates a number of target mobile node identifiers in a request for a batch of test transmissions. After the completion of the batch by the mobile node responsible for sending the test transmissions, the results are reported to base station 130.

It should be noted that the number of network elements and mobile nodes in FIG. 1 is just for illustrative purposes. There may be any number of network elements illustrated in FIG. 1.

The embodiments of the invention described hereinbefore in association with FIG. 1 may be used in any combination with each other. Several of the embodiments may be combined together to form a further embodiment of the invention.

Figure 2:
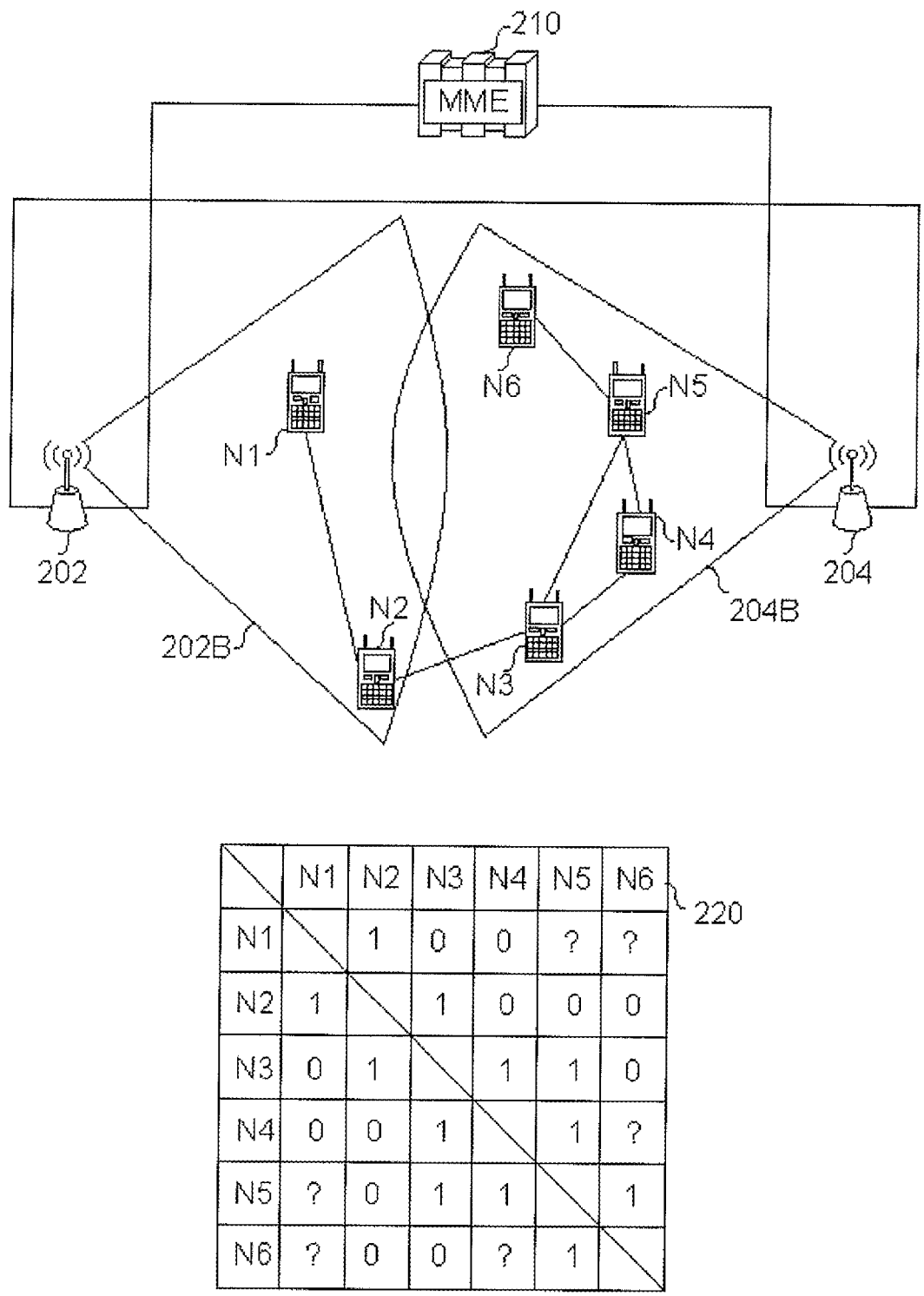
FIG. 2 illustrates two cells with a plurality of communicating mobile nodes within the areas of the two cells in a mobile communication system in one embodiment of the invention.

FIG. 2 illustrates two cells with a plurality of communicating mobile nodes within the areas of the two cells in a mobile communication system in one embodiment of the invention. In FIG. 2 there is a base station 202 providing cell 202B and a base station 204 providing cell 204B. In FIG. 2 there are also mobile nodes N1-N6. Base stations 202 and 204 are communicatively connected to a Mobility Management Entity (MME) 210. A device-to-device link status data structure 220 may stored in a database or in a memory either in base station 202 or in base station 204, or in MME 210. However, in FIG. 2 it is assumed that the device-to-device link status data structure 220 is stored in MME 210. MME 210 may be configured to obtain reports from base station 202 and base station 204 regarding communications optimized by base station 202 or base station 204 to become device-to-device communications or communications determined as device-to-device communications within the mobile node itself. From the number of the device-to-device communications reported to MME 210 via a base station, it determines that it may populate a device-to-device link status data structure regarding mobile node pairs being within device-to-device transmission range. MME 210 may also determine that the device-to-device communications relate to a communication group of mobile nodes, by the communication group may be meant an equivalence class, the equivalence relations of the equivalence class being previous communications occurring between two mobile nodes, for example, within a specific time window or timeframe such as, for example, a day or a week. A further criterion for adding a mobile node to the communication group may include a threshold number of communications to at least one member of the communication group. MME 210 may also determine that the device-to-device communications relate to a specific geographic area, in short a geographic area. The specific geographic area may span at least two cells or it may span a single cell. The geographic area is determined using positioning of mobile nodes, for example, using cell identifiers for the communications that have been obtained from the device-to-device communication radio resource assignments that are later reported to MME 210, using a positioning of mobile nodes or using Timing Advance (TA) or Round Trip Time (RTT) values for mobile nodes, for example, in a cone shaped cell. Further positioning methods for the mobile nodes include at least one of cell identifier and Round Trip Time (RTT) determination, angle of arrival determination, cell identifier and Reference Signal Power Budget (RSPB), cell identifier and Received Signal Code Power (RSCP), Observed Time Difference of Arrival (OTDOA) and satellite based positioning such as the Global Positioning System (GPS). The satellite based positioning or any other positioning performed by a mobile node may be performed by the mobile node in response to a query of the mobile node position from a base station. The query may also originate from MME 210 and may be routed via the base station. A response for the query may be provided from the mobile node to the base station and MME 210. The specific geographic area may also be determined as including a primary cell and at least one neighboring cell. The primary cell may be a small sized cell such as, for example, a pico or nano cell. The neighboring cell may be a larger cell, for example, an umbrella cell. There may also be a number of primary cells. The situation may be, for example, that a group of mobile nodes frequently engage in communication within the primary cell. The primary cell may be provided by a base station within a building, for example, on a given floor. The neighbor cells may be, for example, larger cells provided by base stations on the rooftops of some nearby buildings. The neighbor cells may occasionally provide better radio reception within the planned footprint of the primary cell. Therefore, device-to-device communication routes primarily in the area of the planned footprint of the primary cell may involve links using radio resources from the neighbor cells.

To the set of candidate mobile nodes for storing into data structure 220 or just for determining device-to-device links are included mobile nodes that have performed at least a predefined number of handovers, cell updates or other cell changes between the primary cell and the at least one neighbor cells within a specified timeframe. The specific geographic area may also be determined as including a primary cell and at least one distance range from a neighboring cell, the distance range being within a specified distance from the primary cell. The area determination may be performed in at least one base station, for example, base stations 202 and 204, or in MME 210.

The result of at least one of the mobile node selection based on the specific geographic area, and mobile node selection based on a membership in communication group of mobile nodes, may be that MME 210 produces a list of candidate mobile nodes for storing in device-to-device link status database or data structure 220.

The starting point in FIG. 2 is that MME 210 has determined that device-to-device link status data structure 220 must be collected, that is, populated regarding candidate mobile nodes or simply mobile nodes within a specific cell. Initially, the elements in the data structure 220 representing links are set to an indeterminate value, represented in FIG. 2 as "?". MME 210 may have issued a request to base station 202 and base station 204 to start determining possible device-to-device links i.e. probing. MME 210 indicates to base station 202 a set of candidate mobile nodes from a group of candidate nodes determined in MME 210. Similarly, MME 210 indicates to base station 204 a set candidate mobile nodes from a group of candidate nodes determined in MME 210. The determination of candidate nodes may be based on the criteria indicated above. Base stations 202 and 204 may also first determine that sufficient radio resources are available for testing the mutual reachability between mobile nodes for device-to-device communication. Base station 202 and base station 204 issue test transmission requests to a number of mobile nodes within their respective cells. The mobile nodes transmit test transmissions to other mobile nodes, which respond to the test transmissions, if they are within a sufficient coverage range from the transmitting mobile node. The mobile nodes that have received the responses report the fact of receiving a response in the first place or the radio quality of the response received to base stations 202 and 204. Base station 202 indicates, for example, to mobile node N2 that it must perform a test transmission to mobile node N3 wait for response from mobile node N3 and report the result back to base station 202. Similar procedure may be repeated from mobile node N2 to mobile node N6, for example, based on knowledge that mobile nodes N3 and N6 are outside a specific distance from base station 204, that mobile node N2 is also outside a specific distance from base station 202 and that cell beams from cells 202B and 202B point in opposite directions. In FIG. 2 it is assumed that the test transmission from mobile node N2 to mobile node N3 results to a reply from mobile node N3 and the success of the test is reported to base station 202. Base station 202 further propagates the success report to MME 210, because it stores the device-to-device link status data structure 220 in one embodiment of the invention. The success report causes that the matrix elements at row N2, column N3 and at row N3, column N2 are set to value "1" indicating that the link is on. Generally, the first row and the first column indicate mobile node identifiers and the other matrix elements the link statuses. Links for which there was no report of success even after explicit requesting of test transmission between two mobile nodes from a base station are set to "0", in order to indicate that the link is off. This is the case between mobile nodes N2 and N6 in FIG. 2. If test transmission without a specific recipient is transmitted from a mobile node, for the mobile nodes that answer the link state is set to "1", but for remaining ones it may remain "?", which indicates that the link has not been determined yet with test transmission. The responses from mobile nodes to base stations relayed further to MME 210 identify the sender of the test and the receiver or the receivers. Thereby MME 210 may populate the device-to-device link status data structure with link statuses associated with a link between two mobile nodes. The mobile node identifiers may be at least one of mobile node IP addresses, mobile subscriber identities, international mobile subscriber identities, temporary mobile subscriber identities, and globally unique temporary user equipment identities. Mobile node IP addresses, particularly, IPv4 addresses may be used only when an IP address has been allocated for a mobile node via P-GW. IPv6 addresses do not deplete and may be allocated to mobile nodes for mere device-to-device communication purposes, in addition to IPv6 addresses allocated via a P-GW.

Generally, data structure related procedures between mobile nodes and MME 210, for example, determinations of candidate mobile nodes for storage in the device-to-device link status data structure 220, the ordering of the executing of test transmissions between mobile nodes, updates to data structure 220 pertaining to link status changes and route requests from mobile nodes are relayed via base stations such as base station 202 in one embodiment of the invention.

In one embodiment of the invention, the radio resource assigned for device-to-device communication uses LTE TDD transmission. The transmission may use OFDMA. The transmission may also use SC-FDMA in one embodiment of the invention.

In one embodiment of the invention, the matrix is not symmetric, if TDD transmission is not used or if any other transmission technology is used that may be susceptible of different radio conditions in the two transmission directions between the mobile nodes. Different frequency bands for the different directions may have different interference.

The embodiments of the invention described hereinbefore in association with FIGS. 1 and 2 may be used in any combination with each other. Several of the embodiments may be combined together to form a further embodiment of the invention.

In particular, the arbitration procedure of FIG. 1 may be used if the test transmissions requested by a base station from a mobile node may have multiple recipients without a particular recipient specified by the base station for the mobile node to be included in the test transmission. As explained, the arbitration procedure may used to determine an order or a schedule of responses to the test transmission, so that the responses from different mobile nodes do not interfere with one another. The procedure may be based, for example, on an order computed from recipient mobile node identifiers.

FIG. 3A illustrates a device-to-device link status data structure and the use of the data structure for routing between two mobile nodes in one embodiment of the invention. The device-to-device link status data structure may also be referred to as a device-to-device link state indication table or matrix.

In FIG. 3A there is illustrated a device-to-device link status data structure 220 determined, for example, as explained in association with FIGS. 1 and 2. The data structure 220 may be stored in a base station or in a mobility management entity. In FIG. 3A it may be assumed that the network node storing data structure 220 has received a routing request for determining a route from mobile node N1 to mobile node N6. The topology is assumed to be similar to FIG. 2 with regard to mobile nodes N1-N6, however, the data structure 220 may also be stored in a base station such as 202, for example, if the beam of base station 202 covered all mobile nodes N1-N6. Upon receiving the routing request, the network node starts from column N1, proceeds element by element vertically and determines N2 as the only path forward, because the element at row N2, column N1 is the only one indicating an active link. From row N2 the network node proceeds element by element horizontally and determines N3 as the only path forward, because the element at row N2, column N3 is the only one indicating an active link. Starting from row N2, column N3 there are two possible paths forward, either via row N4, column N3 or via row N5, column N3. This reflects two active links from mobile node N3, either via mobile node N4 or directly to mobile node N5. At a route branching point a separate traversal of data structure 220 may be started for each possible path. A first traversal proceeds vertically to row N5, column N3 and from there horizontally to row N5, column N6, as illustrated with arrow 302. A second traversal proceeds vertically to row N4, column N3 and from there horizontally to row N4, column N5, and from there vertically to row N6, column N5, as illustrated with arrow 301. The matrix is traversed by alternating the checking of row elements until an active link is found and the checking of column elements until an active link is found. The traversal may be terminated after a pre-defined number of iterations based on complexity, processing time and the size of the matrix.

The route determined using the traversal of data structure 220 is indicated to the mobile node requesting the route from a base station. The request may have been relayed to a mobility management node, if data structure 220 is stored in the mobility management node.

FIG. 3B illustrates a device-to-device link status data structure, the use of the data structure for routing between two mobile nodes and the probing of the status of two device-to-device links in one embodiment of the invention.

In one embodiment of the invention, if a route appears to be very long a probing process for link determination between two mobile nodes may be started with the aim of obtaining an active link which provides a shorter path for at least one route. The probing process may be started in at least one of the following conditions: when obtaining a route request to the network node storing data structure 220 and the traversal for finding the route reveals the route to have a number of hops that exceeds a predefined threshold value, when performing route traversal by the network node without a route request, when adding new mobile nodes to data structure 220, and when adding new mobile nodes to data structure 220 and finding at least one route having a number of hops that exceeds a predefined threshold value.

The probing process for link determination means the sending of a test transmission request to either mobile node associated with a potential link and the receiving of a reply regarding the success of the test transmission from the mobile node, as explained, for example, in association with FIGS. 1 and 2. The probing process may be executed by a base station or by a base station at the request of a mobility management entity, if data structure 220 is maintained in the mobility management entity. A probing process may be started only in the cell of a base station in which it has been determined that sufficient radio resources are available for executing the probing, that is, for transmitting the test transmission and their replies.

In one embodiment of the invention, a specific set of radio resources is allowed for the probing. The specific set of radio resources may include at least one resource element, at least one resource block or a specific channel. The specific set of radio resources may be used for other purposes such as device-to-device communication with user data.

In FIG. 3B, in order to obtain a direct path the network element holding data structure 220, either a base station or a mobility management entity, starts the probing process between mobile node N1 and mobile node N6 and thereafter between mobile node N1 and mobile node N5. These probing processes are illustrated with boxes 310 and 312. The result of the first probing process may result to the activation of a link between mobile nodes N1 and N6 and to the setting of matrix elements at row N6, column N1 and at row N1, column N6 to value "1" indicating an active device-to-device link. As a result there would be a single hop route directly from mobile node N1 to mobile node N6. The result of the second probing process may result to the activation of a link between mobile nodes N1 and N5 and to the setting of matrix elements at row N5, column N1 and at row N1, column N5 to value "1" indicating an active device-to-device link. A failure report from the mobile node N1 to the node storing data structure 220 would result to the setting of the corresponding element to value "0".

The embodiments of the invention described hereinbefore in association with FIGS. 1, 2, 3A and 3B may be used in any combination with each other. Several of the embodiments may be combined together to form a further embodiment of the invention.

Figure 4:
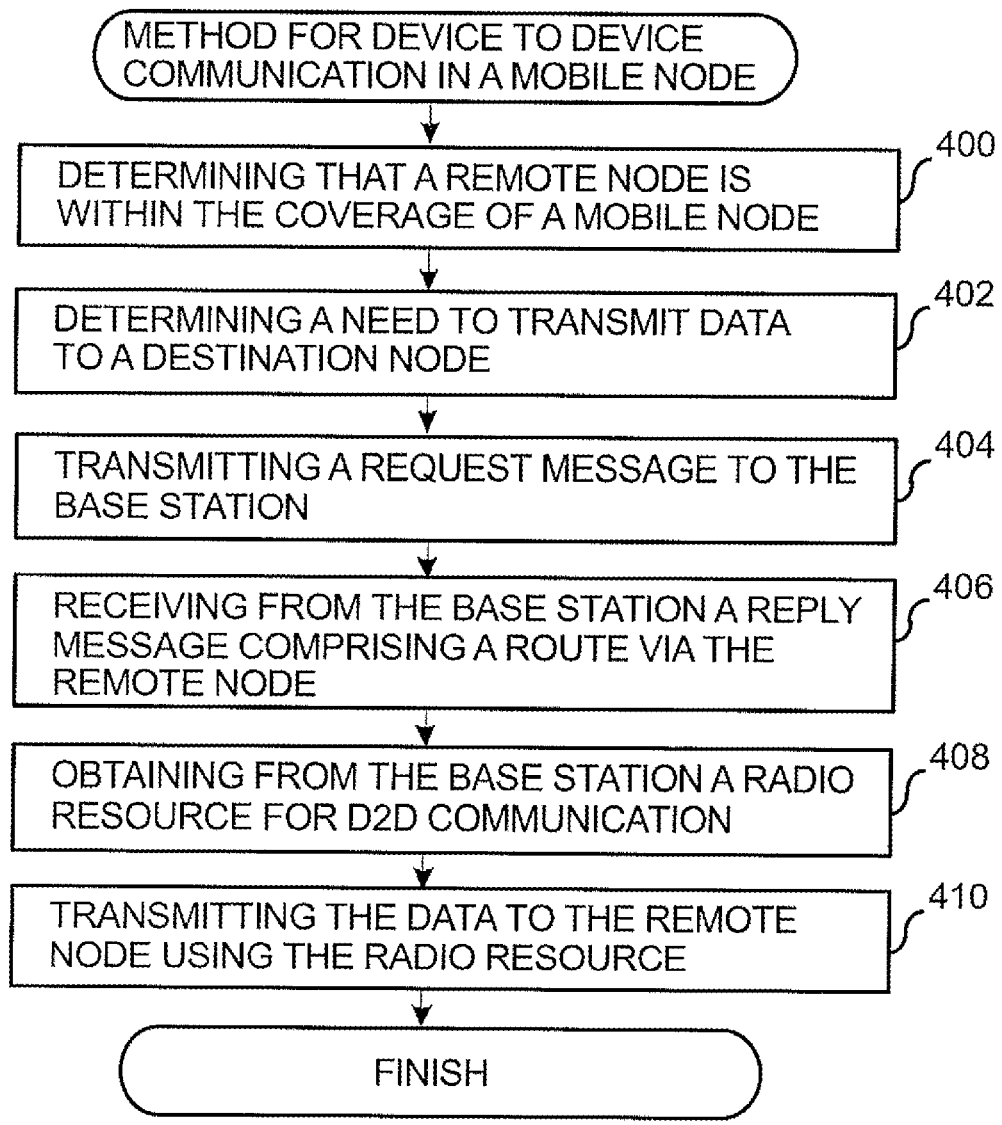
FIG. 4 is a flow chart illustrating a method for device-to-device communication in a mobile node in one embodiment of the invention.

FIG. 4 is a flow chart illustrating a method for device-to-device communication in a mobile node in one embodiment of the invention.

At step 400, a mobile node determines that a remote node is within radio coverage of the mobile node. The determination may be based on a receiving of a test signal, from the remote node, to the mobile node or a receiving of a response, from the remote node, to a test signal transmitted by the mobile node. The determination may include that at least one radio frequency circuit of the mobile node detects the test signal or the response signal to the test signal. The detection may be reported to at least one processor of the mobile node.

In one embodiment of the invention, the mobile node receives a response to the test signal from the remote node. The response is used to determine if sufficient signal quality is available between the mobile node and the remote node.

In one embodiment of the invention, an indication of an existence of a radio link or mutual radio coverage between the mobile node and the remote node is transmitted to a base station. The mobile node and the remote node may be served by the same base station.

In one embodiment of the invention, if the mobile node transmits the response to the test signal to the remote node, the mobile node may receive from the remote node a confirmation that the remote node has indicated an existence of a radio link or mutual radio coverage between the mobile node and the remote node to the base station.

In one embodiment of the invention, the mutual radio coverage means, for example, that the mobile node and the remote node are within each others radio coverage.

At step 402, the mobile node determines a need to transmit a data message to a destination node, for example, a destination mobile node. The data message may be associated with a user plane data packet connection or session.

At step 404, the mobile node transmits a request message to the base station. The request message may be a route request message. The request message may include an identifier of a destination party, for example, an IP address or a logical name, for example, a URI, a Tel-URI or an MSISDN of the destination party. The destination party identifier may be associated with a destination node, which may be identified with a destination node identifier, which may an identifier of the destination node used in at least one of radio access network and device-to-device communication.

At step 406, the mobile node receives from the base station a reply message including a route to the destination node, the route including at least an identifier of the remote node. The remote node may be a first hop in the route towards the destination node.

In one embodiment of the invention, the mobile node may cache the route for a predetermined time. If the use of the cached route within the predefined time does not route a communication establishment request through to the destination node, mobile node may resort to sending the request message to the base station, which may be a route request message.

At step 408, the mobile node transmits to the base station a request for a radio resource for radio communication between the mobile node and the remote node. The mobile node receives from the base station an assignment of the radio resource to the mobile node. The radio resource may include at least one of a resource element, a resource block, a slot, a subframe and a frame. The assignment may concern the at least one of the resource element, the resource block, the slot, the subframe and the frame for a specified time or a specific number of at least one of them.

At step 410, the mobile node transmits the data message to the remote node using the radio resource assigned.

In one embodiment of the invention, the destination party identifier may be an IP address, for example, IPv4 or IPv6 address. The destination node is associated with the destination party identifier via a registration to the network, which associates the destination party identifier to an identifier of the destination node. The destination node may in turn be identified with a subscriber identity such as an IMSI. The subscriber identity may be associated with an apparatus, for example, a mobile terminal via a card or a memory storing the subscriber identity.

In one embodiment of the invention, the mobile node determines the possibility for device-to-device communication to the destination party without attempting to establish the communication via the core network, that is, via at least one router or other node in the core network.

In one embodiment of the invention, the mobile node determines the possibility for device-to-device communication using a separate query to a network node that maps the destination party identifier to an identifier of the destination node. The base station may determine that the destination node identified is within the same cell as the mobile node and in response issue to the mobile node an assignment of a radio resource for radio transmission to a mobile node directly.

Figure 5:
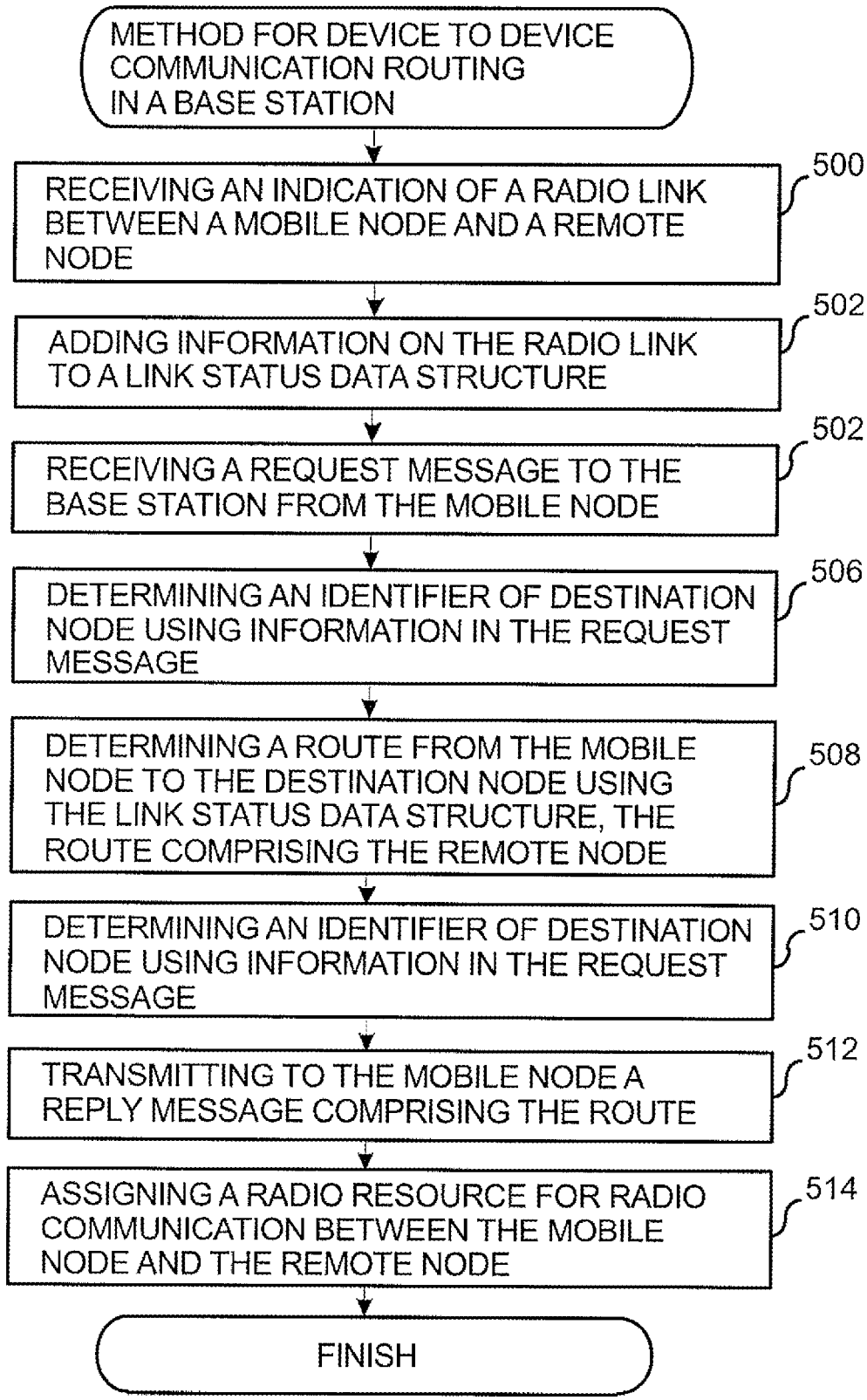
FIG. 5 is a flow chart illustrating a method for device-to-device communication routing in a base station in one embodiment of the invention.

FIG. 5 is a flow chart illustrating a method for device-to-device communication routing in a base station in one embodiment of the invention.

At step 500, a base station receives an indication of an existence of a radio link between a mobile node and a remote node.

At step 502, the base station updates or adds information on the radio link to a link status data structure. The link status data structure may be stored in a remote core network node such as a mobility management entity.

At step 504, the base station receives a request message to the base station. The request message may be a route request message. The request message may be sent further to the remote core network node.

At step 506, the base station or the remote core network node determines an identifier of a destination node using information in the request message.

At step 506, the base station remote or the core network node determines a route from the mobile node to the destination node using the link status data structure, the route including the remote node. The link status data structure may be stored in the remote core network node such as the mobility management entity. At this step the base station may transmit the route request to the remote core network node.

At step 508, the base station transmits a reply message including the route to a destination node, the route including at least an identifier of the remote node. The reply message may originate from the remote core network node.

At step 510, the base station receives from the mobile node a request for a radio resource for radio communication between the mobile node and the remote node.

At step 510, the base station transmits to the mobile node, an assignment of the radio resource for the mobile node. The radio resource may be used for device-to-device communication.

The embodiments of the invention described hereinbefore in association with FIGS. 4 and 5 may be used in any combination with each other. Several of the embodiments may be combined together to form a further embodiment of the invention.

Figure 6:
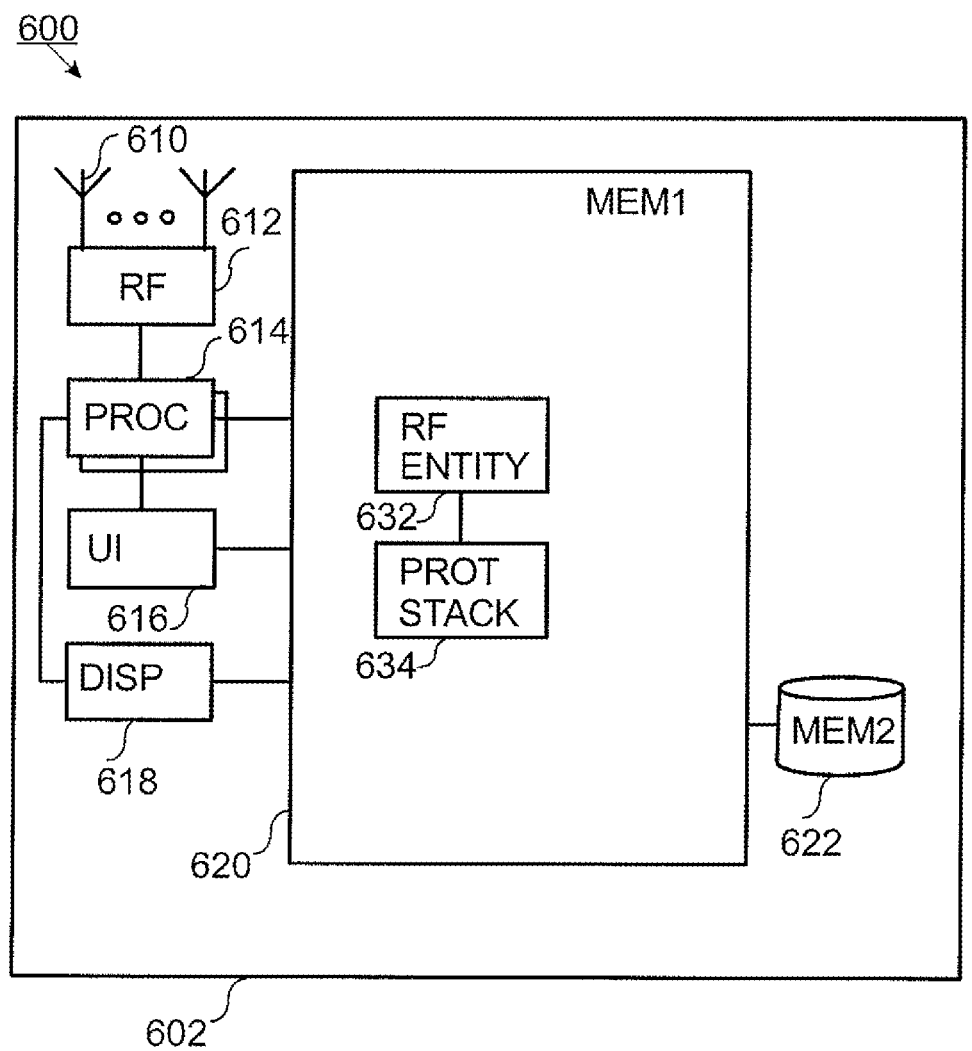
FIG. 6 illustrates an apparatus in one embodiment of the invention.

FIG. 6 is a block diagram illustrating an apparatus in one embodiment of the invention. In FIG. 6 there is an apparatus 600, which is, for example, a mobile node, user equipment, a handset, a cellular phone, a mobile terminal, an Application Specific Integrated Circuit (ASIC), a chip or a chipset. Apparatus 600 may correspond to a mobile node illustrated in FIGS. 1, 2, 3A, 3B and 4. The internal functions of mobile node 600 are illustrated with a box 602. Mobile node 600 may include at least one antenna 610. There may be multiple input and output antennas. In association with mobile node there is Radio Frequency (RF) circuit 612. RF circuit 612 may be also any circuit or may be referred to as circuit 612. RF circuit 612 is communicatively connected to at least one processor 614. Connected to processor 614 there may be a first memory 620, which is, for example, a Random Access Memory (RAM). There may also be a second memory 622, which may be a non-volatile memory, for example, an optical or magnetic disk. There may also be a User Interface (UI) 616 and a display 618. In memory 620 there may be stored software relating to functional entities 632 and 634. An RF entity 632 communicates with RF circuit 612 to perform radio resource allocation, de-allocation, signaling plane and user plane data transmission and reception. RF entity 632 receives an indication of radio resources to be used and request to perform device-to-device transmission testing from a base station via a protocol stack 634. Protocol stack entity 634 includes control plane protocol functions related to the interface towards an eNB or any base station. Protocol stack entity 634 also includes protocol functionalities related to user plane device-to-device transmission. Protocol stack entity 634 may be, for example, an internet protocol stack. RF circuit 612 may include a transmitter for SC-FDMA and a receiver and a transmitter for OFDMA. RF circuit 612 may also include a receiver for SC-FDMA.

When the at least one processor 614 executes functional entities associated with the invention, memory 620 includes entities such as, any of the functional entities 632 and 634. The functional entities within apparatus 600 illustrated in FIG. 6 may be implemented in a variety of ways. They may be implemented as processes executed under the native operating system of the network node. The entities may be implemented as separate processes or threads or so that a number of different entities are implemented by means of one process or thread. A process or a thread may be the instance of a program block including a number of routines, that is, for example, procedures and functions. The functional entities may be implemented as separate computer programs or as a single computer program including several routines or functions implementing the entities. The program blocks are stored on at least one computer readable medium such as, for example, a memory circuit, memory card, magnetic or optical disk. Some functional entities may be implemented as program modules linked to another functional entity. The functional entities in FIG. 4 may also be stored in separate memories and executed by separate processors, which communicate, for example, via a message bus or an internal network within the network node. An example of such a message bus is the Peripheral Component Interconnect (PCI) bus.

The exemplary embodiments of the invention can be included within any suitable device, for example, including any suitable servers, workstations, PCs, laptop computers, PDAs, Internet appliances, handheld devices, cellular telephones, wireless devices, other devices, and the like, capable of performing the processes of the exemplary embodiments, and which can communicate via one or more interface mechanisms, including, for example, Internet access, telecommunications in any suitable form (for instance, voice, modem, and the like), wireless communications media, one or more wireless communications networks, cellular communications networks, 3 G communications networks, 4 G communications networks Public Switched Telephone Network (PSTNs), Packet Data Networks (PDNs), the Internet, intranets, a combination thereof, and the like.

It is to be understood that the exemplary embodiments are for exemplary purposes, as many variations of the specific hardware used to implement the exemplary embodiments are possible, as will be appreciated by those skilled in the hardware art(s). For example, the functionality of one or more of the components of the exemplary embodiments can be implemented via one or more hardware devices, or one or more software entities such as modules.

The exemplary embodiments can store information relating to various processes described herein. This information can be stored in one or more memories, such as a hard disk, optical disk, magneto-optical disk, RAM, and the like. One or more databases can store the information regarding cyclic prefixes used and the delay spreads measured. The databases can be organized using data structures (e.g., records, tables, arrays, fields, graphs, trees, lists, and the like) included in one or more memories or storage devices listed herein. The processes described with respect to the exemplary embodiments can include appropriate data structures for storing data collected and/or generated by the processes of the devices and subsystems of the exemplary embodiments in one or more databases.

All or a portion of the exemplary embodiments can be implemented by the preparation of one or more application-specific integrated circuits or by interconnecting an appropriate network of conventional component circuits, as will be appreciated by those skilled in the electrical art(s).

As stated above, the components of the exemplary embodiments can include computer readable medium or memories according to the teachings of the present inventions and for holding data structures, tables, records, and/or other data described herein. Computer readable medium can include any suitable medium that participates in providing instructions to a processor for execution. Such a medium can take many forms, including but not limited to, non-volatile media, volatile media, transmission media, and the like. Non-volatile media can include, for example, optical or magnetic disks, magneto-optical disks, and the like. Volatile media can include dynamic memories, and the like. Transmission media can include coaxial cables, copper wire, fiber optics, and the like. Transmission media also can take the form of acoustic, optical, electromagnetic waves, and the like, such as those generated during radio frequency (RF) communications, infrared (IR) data communications, and the like. Common forms of computer-readable media can include, for example, a floppy disk, a flexible disk, hard disk, magnetic tape, any other suitable magnetic medium, a CD-ROM, CDRW, DVD, any other suitable optical medium, punch cards, paper tape, optical mark sheets, any other suitable physical medium with patterns of holes or other optically recognizable indicia, a RAM, a PROM, an EPROM, a FLASH-EPROM, any other suitable memory chip or cartridge, a carrier wave or any other suitable medium from which a computer can read.

While the present inventions have been described in connection with a number of exemplary embodiments, and implementations, the present inventions are not so limited, but rather cover various modifications, and equivalent arrangements, which fall within the purview of prospective claims.

The embodiments of the invention described hereinbefore in association with the figures presented may be used in any combination with each other. Several of the embodiments may be combined together to form a further embodiment of the invention.

It is obvious to a person skilled in the art that with the advancement of technology, the basic idea of the invention may be implemented in various ways. The invention and its embodiments are thus not limited to the examples described above; instead they may vary within the scope of the claims.

What is claimed is:

1. A method, comprising:
    determining that a remote node is within radio coverage of a mobile node;
    determining, in the mobile node, a need to transmit a data message to a destination node;
    transmitting a request message to a base station;
    receiving from the base station a reply message comprising a route to the destination node, the route comprising at least an identifier of the remote node;
    transmitting, to the base station, a request for a radio resource for radio communication between the mobile node and the remote node;
    receiving, from the base station, an assignment of the radio resource to the mobile node; and
    transmitting the data message to the remote node using the radio resource.

2. The method according to claim 1, wherein the determining that the remote node is within the radio coverage of the mobile node further comprises:
    receiving a test signal from the remote node; and
    transmitting a response to the test signal to the remote node.

3. The method according to claim 2, further comprising:
    transmitting an indication of an existence of a radio link between the mobile node and the remote node to the base station.

4. The method according to claim 1, wherein the destination node is identified with a destination party identifier in the request message.

5. The method according to claim 4, wherein the destination party identifier comprises at least one of an internet protocol address, a logical name of a user of the destination node, a domain name, a uniform resource identifier, or a mobile subscriber Integrated Services Digital Network (ISDN) number.

6. The method according to claim 1, further comprising:
    transmitting the data message using an orthogonal frequency division multiple access transmission.

7. The method according to claim 1, wherein
    the identifier of the remote node is at least one of a mobile subscriber identity, an international mobile subscriber identity, a temporary mobile subscriber identity, a globally unique temporary user equipment identity, or a radio network temporary identifier.

8. The method according to claim 1, wherein the determining that the remote node is within the radio coverage of the mobile node further comprises:
    transmitting a test signal from the mobile node; and
    receiving a response to the test signal from the remote node.

9. The method according to claim 8, further comprising:
    receiving from the base station a request to execute the transmission of the test signal.

10. The method according to claim 1, further comprising:
    transmitting the data message using a single carrier frequency division multiple access transmission.

11. The method according to claim 1, further comprising:
    determining a quality degradation in the radio resource; and
    transmitting an indication of non-existence of a radio link between the mobile node and the remote node to the base station.

12. The method according to claim 1, wherein the mobile node comprises a Long-Term Evolution (LTE) User Equipment.

13. The method according to claim 1, wherein the remote node is a remote mobile node.

14. An apparatus, comprising:
    one or more processors, one or more circuits, or any combination thereof configured to:
    determine that a remote node is within radio coverage of the apparatus;
    determine a need to transmit a data message to a destination node;
    transmit a request message to a base station;
    receive from the base station a reply message comprising a route to the destination node, the route comprising at least an identifier of the remote node;
    transmit to the base station, a request for a radio resource for radio communication between the apparatus and the remote node;
    receive from the base station an assignment of the radio resource to the apparatus; and
    transmit the data message to the remote node using the radio resource.

15. The apparatus according to claim 14, wherein the determining that the remote node is within the radio coverage of the apparatus further comprises the one or more processors, the one or more circuits, or any combination thereof configured to:
    receive a test signal from the remote node;
    transmit a response to the test signal to the remote node; and
    transmit an indication of an existence of a radio link between the apparatus and the remote node to a base station.

16. The apparatus according to claim 14, wherein the determining that the remote node is within the radio coverage of the apparatus further comprises the one or more processors, the one or more circuits, or any combination thereof configured to:
    transmit a test signal from the apparatus;
    receive a response to the test signal from the remote node; and
    receive from the base station a request to execute the transmission of the test signal.

17. The apparatus according to claim 14,
    wherein the destination node is identified with a destination party identifier in the request message, and
    wherein the destination party identifier comprises at least one of an internet protocol address, a logical name of a user of the destination node, a domain name, a uniform resource identifier, or a mobile subscriber Integrated Services Digital Network (ISDN) number.

18. The apparatus according to claim 14, further comprising the one or more processors, the one or more circuits, or any combination thereof configured to:
    transmit the data message using an orthogonal frequency division multiple access transmission or a single carrier frequency division multiple access transmission.

19. The apparatus according to claim 14, wherein the identifier of the remote node comprises at least one of a mobile subscriber identity, an international mobile subscriber identity, a temporary mobile subscriber identity, a globally unique temporary user equipment identity, or a radio network temporary identifier.

20. A non-transitory computer-readable medium having machine instructions stored therein, the instructions when executed by at least one processor, cause the at least one processor to:
   determine that a remote node is within radio coverage of a mobile node;
   determine a need to transmit a data message to a destination node;
   transmit a request message to a base station;
   receive from the base station a reply message comprising a route to the destination node, the route comprising at least an identifier of the remote node;
   transmit, to the base station, a request for a radio resource for radio communication between the mobile node and the remote node;
   receive, from the base station, an assignment of the radio resource to the mobile node; and
   transmitting the data message to the remote node using the radio resource.

* * * * *